(12) United States Patent
Speight

(10) Patent No.: US 8,031,654 B2
(45) Date of Patent: Oct. 4, 2011

(54) WIRELESS COMMUNICATION SYSTEM, APPARATUS FOR SUPPPORTING DATA FLOW AND METHODS THEREFOR

(75) Inventor: Timothy J. Speight, Bristol (GB)

(73) Assignee: Wireless Technology Solutions, LLC, New York, NY (US)

( * ) Notice: Subject to any disclaimer, the term of this patent is extended or adjusted under 35 U.S.C. 154(b) by 918 days.

(21) Appl. No.: 11/726,397

(22) Filed: Mar. 20, 2007

(65) Prior Publication Data

US 2008/0045263 A1    Feb. 21, 2008

(30) Foreign Application Priority Data

Aug. 16, 2006 (GB) .................................. 0616241.6

(51) Int. Cl.
  *H04W 4/00* (2009.01)

(52) U.S. Cl. ..... 370/328; 455/451; 455/450; 455/452.1; 455/452.2

(58) Field of Classification Search .................. 370/328; 455/450, 451, 452.1, 452.2
See application file for complete search history.

(56) References Cited

U.S. PATENT DOCUMENTS

| 2005/0054347 A1* | 3/2005 | Kakani ........................ 455/452.1 |
| 2005/0138243 A1* | 6/2005 | Tierney et al. ................... 710/52 |
| 2005/0152394 A1 | 7/2005 | Cho |

FOREIGN PATENT DOCUMENTS

| EP | 1 633 099 A1 | 3/2006 |
| WO | WO 2004/034656 | 4/2004 |
| WO | WO 2005/002148 | 1/2005 |
| WO | WO2005002148 | * 6/2005 |

OTHER PUBLICATIONS

"3rd Generation Partnership Project; Technical Specification Group Services and System Aspects; General Packet Radio Service (GPRS); Service Description; Stage 2 (Release 7)," (Mar. 2007). 3GPP:Valbonne, France, TS 23.060 v7.4.0:1-216.

"3rd Generation Partnership Project; Technical Specification Group Radio Access Network; UTRAN Overall Description (Release 7)," (Mar. 2007). 3GPP:Valbonne, France, TS 25.401 v7.3.0:1-49.

"Transmission Control Protocol, Darpa Internet Program, Protocol Specification," (Sep. 1981). Information Sciences Institute, University of Southern California, RFC793, located at <http://www.faqs.org/ftp/rfc/pdf/rfc793.txt.pdf> (85 pages).

(Continued)

*Primary Examiner* — Charles Shedrick

(74) *Attorney, Agent, or Firm* — Fitch Even Tabin & Flannery

(57) ABSTRACT

An apparatus for use in allocating resource in a wireless communication system employing transfer communication protocol (TCP) based data transfer between a network and a wireless subscriber communication unit comprises a scheduler located in the network, wherein the scheduler buffers a TCP data segment for downlink (DL) transmission. A transmitter is arranged to transmit the buffered TCP data segment to the UE; wherein the message indicates an allocation of DL resources plus sufficient uplink resources to transfer a stand-alone ACK data segment. In this manner, for example in large bulk data transfer cases, a reduced latency may be achieved that may lead to improved throughput, due to the fact that the overall throughput may be limited by the window size (i.e. number of unacknowledged segments) rather than the throughput possible across the air interface.

24 Claims, 5 Drawing Sheets

OTHER PUBLICATIONS

Braden, R. ed. (Oct. 1989). "Requirements for Internet Hosts—Communication Layers," RFC1122, located at <http://www.ietf.org/rfc/rfc1122.txt> (116 pages).

Holma, H. et al. eds. (2001). *WCDMA for UMTS: Radio Access for Third Generation Mobile Communications.* John Wiley & Sons Ltd.: West Sussex, England, 10 pages (Table of Contents).

Mouly, M. et al. (1992). *The GSM System for Mobile Communications.* Telecom Publishing: Olympia, Washington, 8 pages (Table of Contents).

Zhang, H. (Oct. 1995). "Service Disciplines for Guaranteed Performance Service in Packet-Switching Networks," *Proceedings of the IEEE* 83(10):1374-1396.

International Search Report and Written Opinion of the International Searching Authority from PCT/IB2007/002226 Dated Jul. 21, 2008.

British Search Report Under Section 17 from British Patent Application No. GB0616241.6 Dated Nov. 20, 2006.

\* cited by examiner

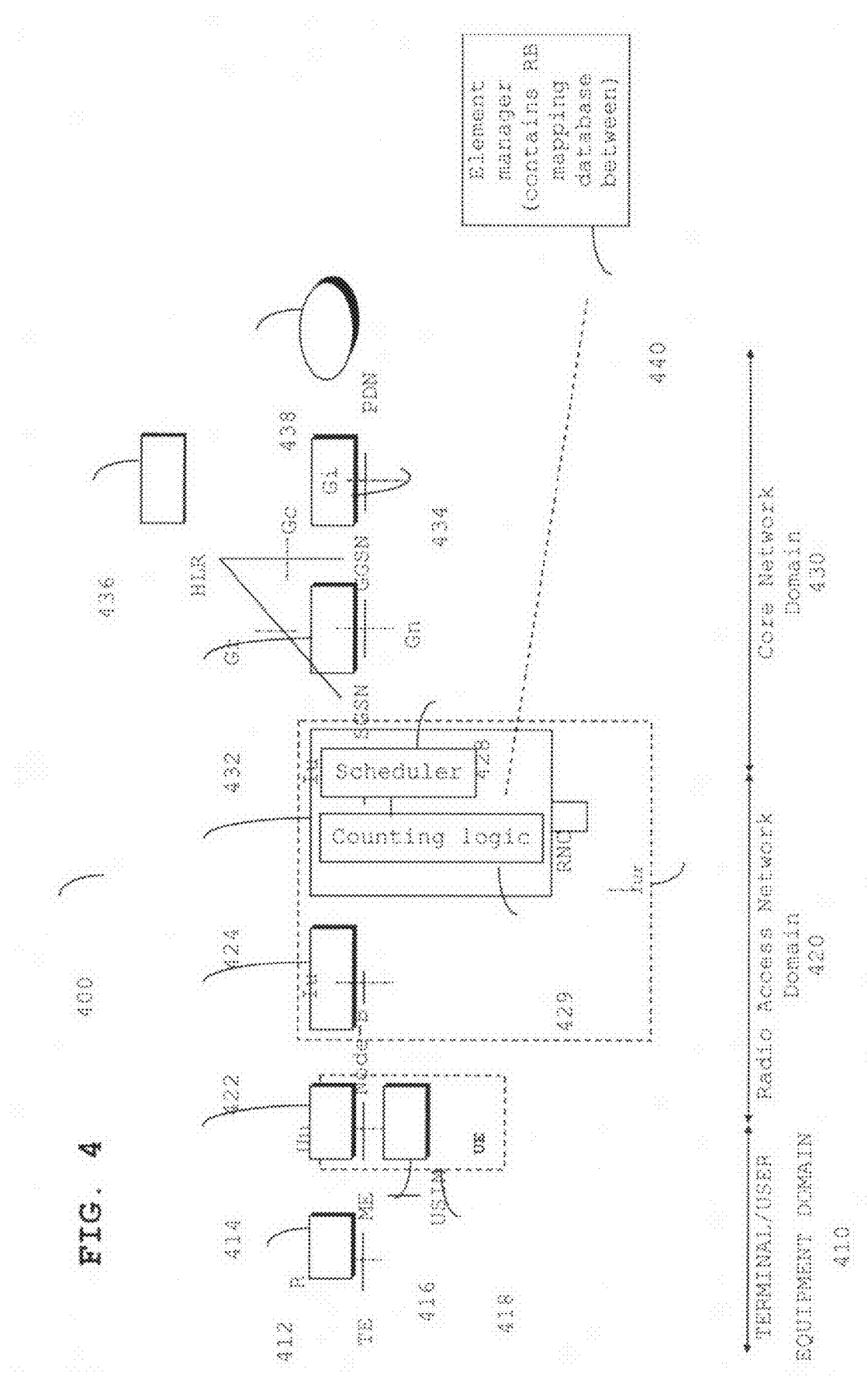

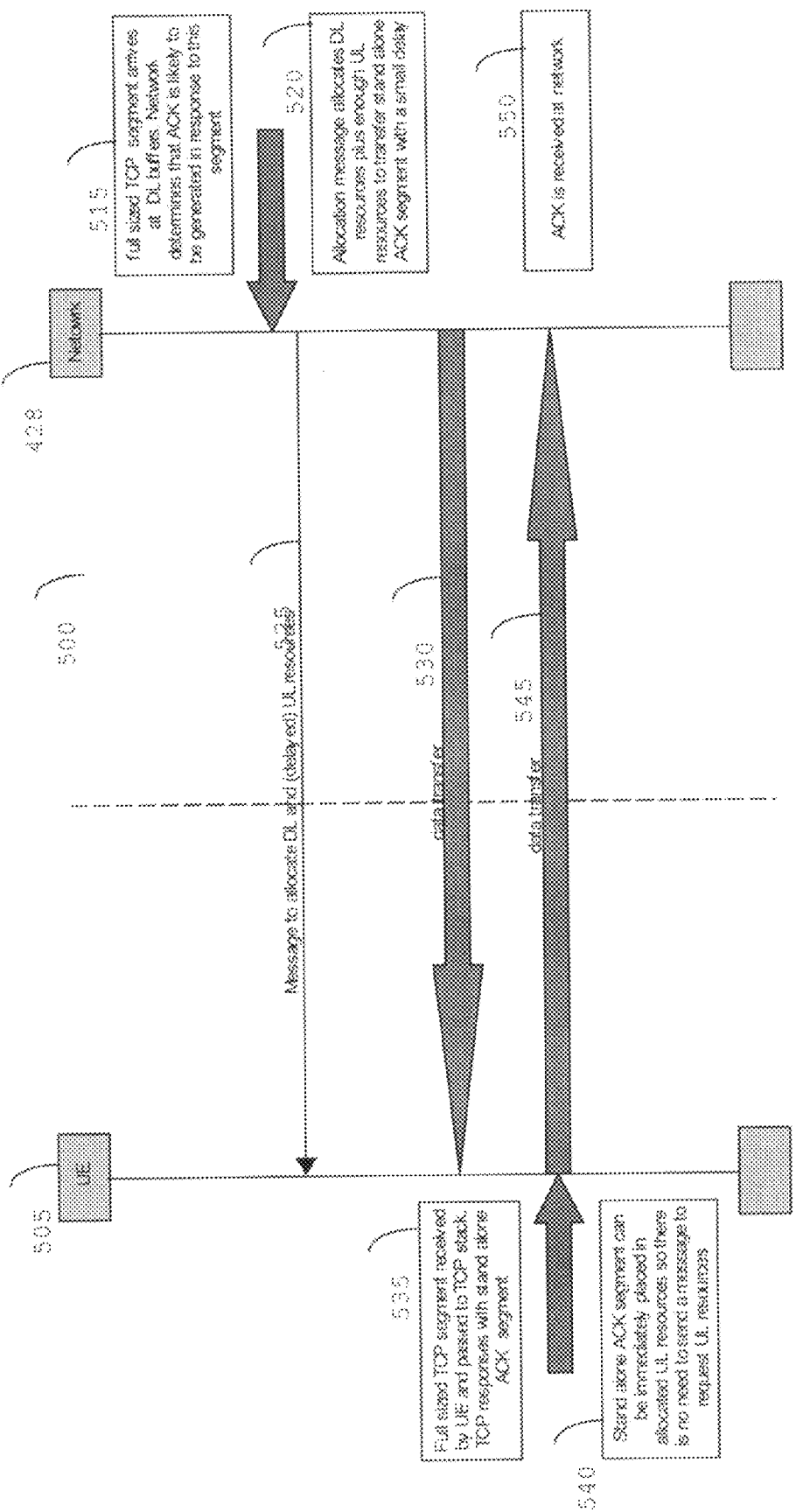

WIRELESS COMMUNICATION SYSTEM, APPARATUS FOR SUPPPORTING DATA FLOW AND METHODS THEREFOR

CROSS-REFERENCE TO RELATED APPLICATIONS

This application is a U.S. application claiming priority from United Kingdom Application No. GB0616241.6 filed Aug. 16, 2006, which is herein incorporated by reference in its entirety.

FIELD OF THE INVENTION

This invention relates to a mechanism to support Internet Protocol data flows within a wireless communication system. The invention is applicable to, but not limited to, packet data transmissions, for example, for use in the universal mobile telecommunication standard.

BACKGROUND OF THE INVENTION

In a cellular communication system, a geographical region is divided into a number of cells, each of which is served by base stations, sometimes referred to as Node-Bs. The base stations are interconnected by a fixed network that is able to transfer data between respective base stations. A mobile station, sometimes referred to as user equipment (UE), is served via a radio communication link from the base station of the cell within which the mobile station is situated.

A typical cellular communication system extends coverage over an entire country and comprises hundreds or even thousands of cells supporting thousands or even millions of mobile stations. Communication from a mobile station to a base station is known as the uplink (UL), and communication from a base station to a mobile station is known as the downlink (DL).

The fixed network interconnecting the base stations is operable to route data between any two base stations, The fixed network interconnecting the base stations is operable to route data between any two base stations, thereby enabling a mobile station in a cell to communicate with a mobile station in any other cell. In addition, the fixed network comprises gateway functions for interconnecting to external networks such as the Internet or the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

Currently, the most ubiquitous cellular communication system is the 2nd generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. Further description of the GSM TDMA communication system can be found in 'The GSM System for Mobile Communications' by Michel Mouly and Marie Bernadette Pautet, Bay Foreign Language Books, 1992, ISBN 2950719007.

Currently, 3rd generation systems are being rolled out to further enhance the communication services provided to mobile users. The most widely adopted 3rd generation communication systems are based on Code Division Multiple Access (CDMA) technology. Both Frequency Division Duplex (FDD) and Time Division Duplex (TDD) techniques employ this CDMA technology. In CDMA systems, user separation is obtained by allocating different spreading and scrambling codes to different users on the same carrier frequency and in the same time intervals. In TDD, additional user separation is achieved by assigning different time slots to different users similarly to TDMA. However, in contrast to TDMA, TDD provides for the same carrier frequency to be used for both uplink and downlink transmissions. An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a 3rd generation cellular communication system, the communication network comprises a core network and a Radio Access Network (RAN). The core network is operable to route data from one part of the RAN to another, as well as interfacing with other communication systems. In addition, it performs many of the operation and management functions of a cellular communication system, such as billing. The RAN is operable to support wireless user equipment over a radio link of the air interface. The RAN comprises the base stations, which in UMTS are known as Node Bs, as well as Radio Network Controllers (RNC) that control the base stations and the communication over the air interface.

The RNC performs many of the control functions related to the air interface including radio resource management and routing of data to and from appropriate base stations. It further provides the interface between the RAN and the core network. An RNC and associated base stations are known as a Radio Network Subsystem (RNS).

3rd generation cellular communication systems have been specified to provide a large number of different services including efficient packet data services. For example, downlink packet data services are supported within the 3GPP release 5 specifications in the form of the High Speed Downlink Packet Access (HSDPA) service. A High Speed Uplink Packet Access (HSUPA) feature is also in the process of being standardised. This uplink packet access feature will adopt many of the features of HSDPA.

In accordance with the 3GPP specifications, the HSDPA service may be used in both Frequency Division Duplex (FDD) mode and Time Division Duplex (TDD) mode.

In HSDPA, transmission code resources are shared amongst users according to their traffic needs. The base station or 'Node-B' is responsible for allocating and distributing the resources to the users, within a so-called scheduling task. Hence, for HSDPA, some scheduling is performed by the RNC, whereas other scheduling may be performed by the base station. Specifically, the RNC allocates a set of resources to each base station, which the base station can use exclusively for high-speed packet services. The RNC furthermore controls the flow of data to and from the base stations.

Therefore, most packet-based systems contain schedulers that control when the individual data packets are transmitted, in order to share the available resource, whether time-slots in a time division multiple access (TDMA) communication system or power and codes in a code division multiple access (CDMA) communication system. An introduction to schedulers can be found in 'Service discipline for guaranteed performance service in packet-switching networks', authored by Hui Zhang, and published in the Proceedings of the IEEE, volume 83, no. 10, October 1995.

Referring now to FIG. 1, an example of UL data transfer 100, in a 'request and allocate' system, is illustrated. The data transfer is performed between a UE 105 and a network 110. The key attribute for schedulers operating in such systems is that the allocation of the shared resources in the uplink is based on a 'request and allocate' principle. Specifically, when the UE 105 determines that it has new data arriving in its buffers to be transmitted, in step 115, the UE 105 transmits a request message 120 for resources from the network in a specific message. This specific message usually contains an indication of the volume of data in the UE's buffers that is to be transmitted. When the network receives this message in step 125, the request is then passed to the scheduler and subsequently uplink (UL) resources are allocated to the UE, in step 130. This allocation is signalled in a separate allocation message, as shown in step 135. When the UE receives this message in step 140, the UE may send the UL data on the specified air interface resource(s), and the consequent data transfer is shown in step 145.

A similar, though simpler, procedure occurs in the downlink (DL) direction. Of course no message needs to be sent over the air interface to tell the scheduler the state of the DL buffers at the network end of the system. This means that allocation in the DL is subject to much lower latency than in the UL.

Transport communication protocol (TCP) is a protocol in the well-known TCP/IP (Internet Protocol) suite of communication protocols (see [RFC 793] for a full description of the TCP protocol). TCP provides a connection-orientated, reliable, byte stream service. The reliability is maintained by the use of acknowledgement messages (ACKs) that are sent by the receiver back to the transmitter, in response to a received segment. In this manner, lost or corrupted data segments may be indicated to the transmitter, and these lost or corrupted data segments may be re-sent.

However, in TCP the receiver does not immediately send an acknowledgment for every received segment. A functionality termed 'delayed ACK' is employed (see [RFC 813]). When a data segment is received, a delay timer is started and an ACK data segment is sent in response to one of the following conditions:
  a) The delay timer expires.
  b) New Data is returned to the original transmitter of the segment (i.e. in interactive style applications, such as 'rlogin') and this new data can be 'piggybacked' with an ACK message.
  c) More segments are received from the transmitter.

In the case of bulk data transfer it is condition-(c) that is the most likely, as the transmitter is, ideally, continuously sending new segments.

Typically only one more segment is required for an ACK to be sent. The following quote is from [RFC 1122]:
  'When used, a TCP receiver MUST NOT excessively delay acknowledgments. Specifically, an ACK SHOULD be generated for at least every second full-sized segment, and MUST be generated within 500 msec. of the arrival of the first unacknowledged packet.'

Most current TCP stacks implement the delayed ACK functionality so that an ACK is generated when a single TCP segment is received, whilst the delay timer is running (i.e. an 'ACK' is transmitted for 'every second full-sized data segment' received, since the reception of a single TCP segment is enough to start the timer in the first place). Also the delay timer is typically set to 200 msec.

The delayed ACK feature is shown diagrammatically in FIG. 2, with a TCP segment 215 transmitted between a transmitter 210 and a receiver 205 (note that the typical configuration in wireless systems will be that the network is the transmitter and the UE is the receiver) Here, the TCP segment 215 is received at the receiver 205. However, the receiver 205 does not transmit an ACK message immediately, and waits until the delay timer has expired, as no data arrives that can be piggy-backed onto the data that is to be sent to the transmitter 210 in addition to no other subsequent TCP segments are received from the transmitter 210. After the delay timer expires, after a period 225, the receiver 205 transmits a stand-alone ACK segment 230.

Thereafter, in the second case, two full-sized TCP segments 235 are transmit by the transmitter 210. The two full-sized TCP segments 235 are received at the receiver 205. The receiver 205 does not immediately transmit an ACK to the transmitter 210, after receipt of the first of the two full-sized TCP segments 235. However, after receipt of the second of the two full-sized TCP segments 235, the receiver 205 immediately transmits an ACK in step 240. For completeness, it is noteworthy that FIG. 2 shows a typical case of 'slow start' in TCP.

In the case of bulk TCP data transfer the delayed ACK feature leads to an ACK being transmitted every other segment.

When TCP is used (for bulk data transfer) in 'request and allocate' wireless communication systems (i.e. one using the shared channel concept), a message flow between a UE 305 and the network 310 occurs, similar to the data flow illustrated in FIG. 3. Here, at least one full-sized TCP segment arrives at a network's DL buffer, in step 315. The network 310 transmits a message to the UE 305 to allocate DL resources, as shown in step 320. This message is followed by the TCP data transfer, as shown in step 325. The at least one full-sized TCP segment is received by the UE 305, in step 330, which passes the at least one full-sized TCP segment to its TCP memory stack.

The UE 305 then transmits a message to the network 310, requesting UL resources to transmit an ACK message, as shown in step 340. In response thereto, the network 310 transmits a message to the UE 305 allocating UL resources, as shown in step 345. Thereafter, the UE 305 is able to implement the data transfer in step 355, which includes an 'ACK' message. Notably, a significant latency 350 exists with this request for an allocated resource.

Thus, there exists a need to provide an improved mechanism to provide bulk IP data transfer flow.

SUMMARY OF THE INVENTION

In accordance with aspects of the present invention, there is provided apparatus, a wireless communication system, a method for acknowledging an allocation of resource and a method for allocating resource and computer program product, as defined in the appended Claims.

Accordingly, in one embodiment of the present invention there is provided an apparatus for use in allocating resource in a wireless communication system employing transfer communication protocol (TCP) based data transfer between a network and a wireless subscriber communication unit. The apparatus comprises a scheduler located in the network, wherein the scheduler buffers a TCP data segment for downlink (DL) transmission. A transmitter arranged to transmit the buffered TCP data segment to the UE; wherein the message indicates an allocation of DL resources plus sufficient uplink resources to transfer a stand-alone ACK data segment.

The provision of a message that indicates an allocation of DL resources plus sufficient uplink resources to transfer a stand-alone ACK data segment enables a wireless subscriber communication unit to process the downlink message to identify an allocation of DL resources plus sufficient uplink resources and transmit a stand-alone ACK data segment in response to the downlink message.

In one embodiment of the present invention, the apparatus comprises counting logic operably coupled to scheduler and arranged to count a number of transmitted segments, as they are transferred to the UE.

The provision of counting logic provides a mechanism to count every DL full sized segment separately in each TCP flow (if there are multiple) and use the counting logic to ensure that when the second segment is sent UL resources are allocated. The counter is then reset.

In one embodiment of the present invention, the apparatus is located in a radio access network that comprises the scheduler arranged to allocate resources to a plurality of user equipment.

In one embodiment of the present invention, the apparatus is arranged to operate in a $3^{rd}$ Generation Partnership Project (3GPP) cellular communication system.

In one embodiment of the present invention, the apparatus is arranged to operate in a time division duplex code division multiple access cellular communication system.

In one embodiment of the present invention, a wireless subscriber communication unit for use in acknowledging an allocation of resource in a wireless communication system employing transfer communication protocol (TCP) based data transfer between a network and the wireless subscriber communication unit comprises a receiver arranged to receive a downlink message comprising a TCP data segment. Processing logic, operably coupled to the receiver, is arranged to process the downlink message to identify an allocation of DL resources plus sufficient uplink resources to transfer a stand-alone ACK data segment. A transmitter is arranged to transmit a stand-alone ACK data segment in response to the downlink message.

In one embodiment of the present invention, the wireless subscriber communication unit immediately transmits the stand-alone ACK data segment in the allocated UL resources following processing the downlink message.

In one embodiment of the present invention, a method for allocating resource in a wireless communication system employing transfer communication protocol (TCP) based data transfer between a network and a wireless subscriber communication unit comprises buffering a TCP data segment for downlink (DL) transmission; transmitting the buffered TCP data segment to the wireless subscriber communication unit within a message. The message indicates an allocation of DL resources plus sufficient uplink resources to transfer a stand-alone ACK data segment from the wireless subscriber communication unit.

In one embodiment of the present invention, a method for acknowledging an allocation of resource in a wireless communication system employing transfer communication protocol (TCP) based data transfer between a network and a wireless subscriber communication unit comprises receiving a downlink message comprising a TCP data segment. The method further comprises processing the downlink message; identifying an allocation of downlink resources plus sufficient uplink resources to transfer a stand-alone acknowledgement (ACK) data segment; and transmitting the stand-alone ACK data segment in response to the downlink message.

In one embodiment of the present invention, a computer program product comprises executable program code for allocating resource in a wireless communication system. The computer program product comprises program code for buffering a TCP data segment for downlink (DL) transmission; transmitting the buffered TCP data segment to the wireless subscriber communication unit within a message. The message indicates an allocation of DL resources plus sufficient uplink resources to transfer a stand-alone ACK data segment from the wireless subscriber communication unit.

In one embodiment of the present invention, there is provided wireless communication system comprising a radio access network facilitating communication to a plurality of wireless communication units. The wireless communication system comprises a scheduler located in the network, wherein the scheduler buffers a TCP data segment for downlink (DL) transmission; a transmitter arranged to transmit the buffered TCP data segment to the UE. The message indicates an allocation of DL resources plus sufficient uplink resources to transfer a stand-alone ACK data segment.

In one embodiment of the present invention, the wireless communication system further comprises a wireless subscriber communication unit comprising a receiver arranged to receive the downlink message comprising a TCP data segment; processing logic, operably coupled to the receiver and arranged to process the downlink message to identify an allocation of downlink resources plus sufficient uplink resources to transfer a stand-alone ACK data segment; and a transmitter arranged to transmit a stand-alone ACK data segment in response to the downlink message.

BRIEF DESCRIPTION OF THE DRAWINGS

FIG. 3 illustrates a 'request and allocate' wireless communication system where TCP is used for bulk data transfer in a message flow between a UE and a network. Embodiments of the invention will be described, by way of example only, with reference to the accompanying drawings, in which:

FIG. 4 illustrates a 3GPP cellular communication system capable of supporting embodiments of the present invention; and FIG. 5 illustrates a method to support a transmission of an ACK message in a TCP-based wireless communication system employing resource and allocation acknowledge messages, according to embodiments of the present invention.

DESCRIPTION OF EMBODIMENTS OF THE INVENTION

Figure 1:
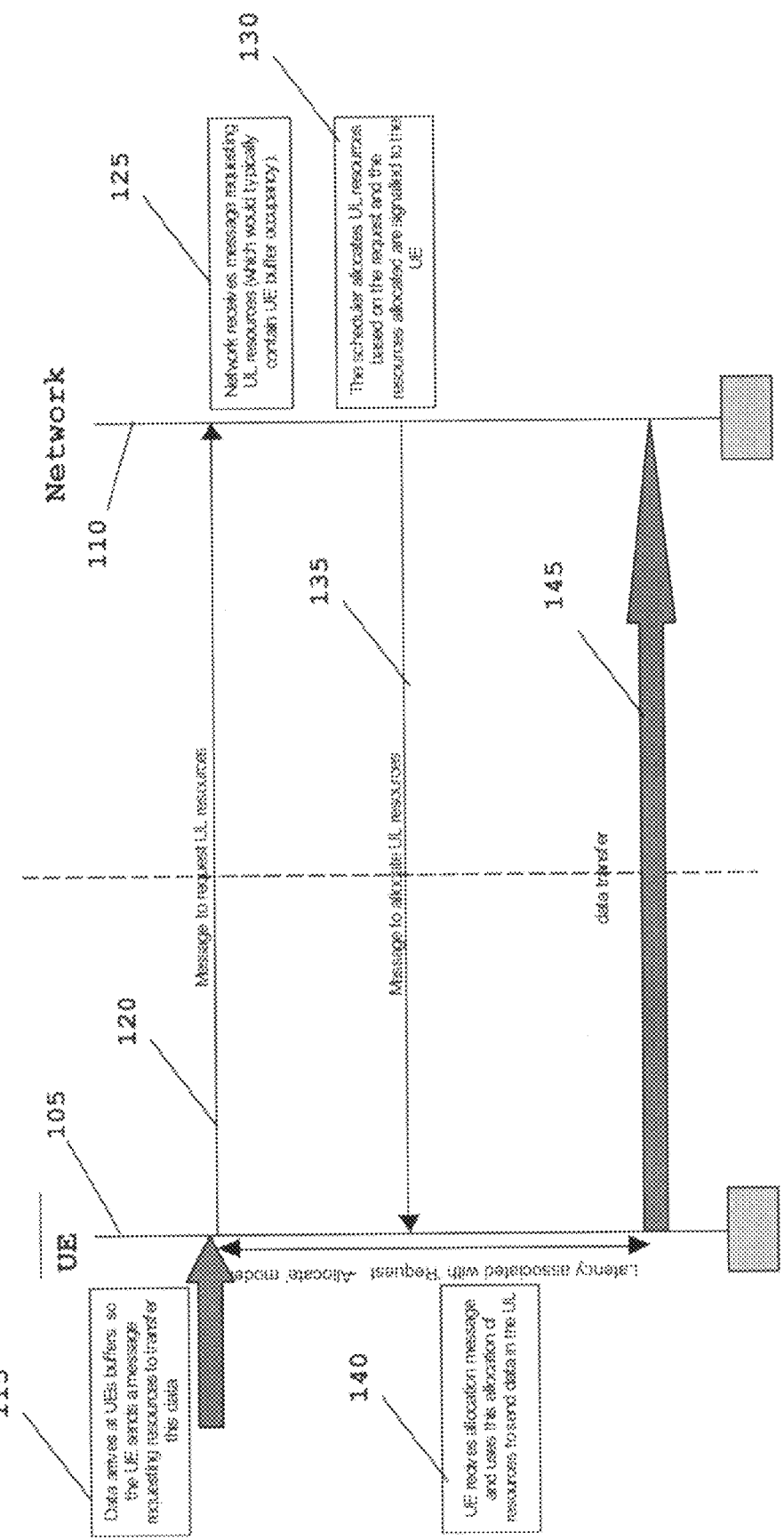
FIG. 1 illustrates a known example of UL data transfer, in a 'request and allocate' system.
Figure 2:
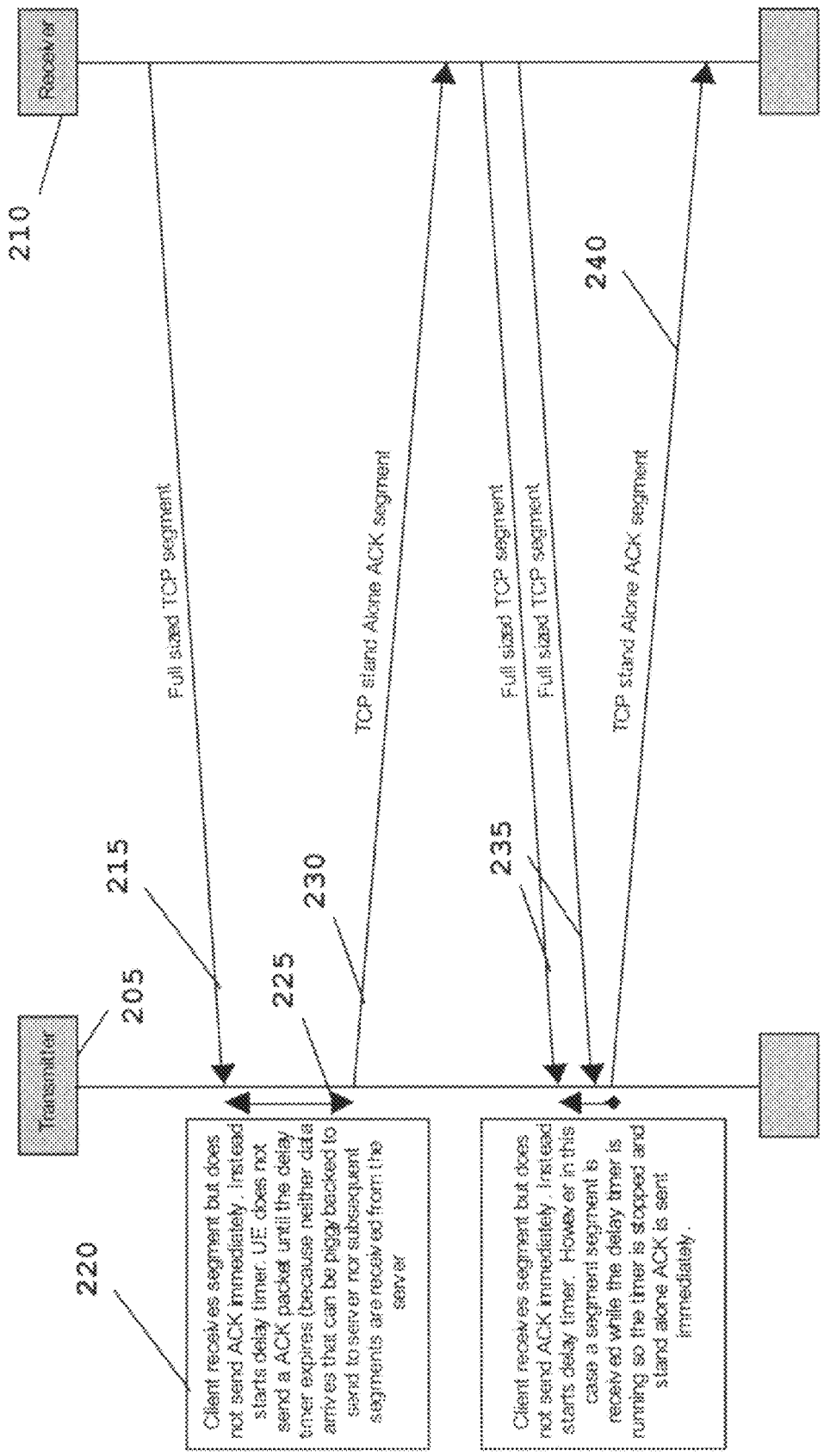
FIG. 2 illustrates a known delayed 'ACK' feature, with a TCP segment transmitted between a transmitter and a receiver.
Figure 3:
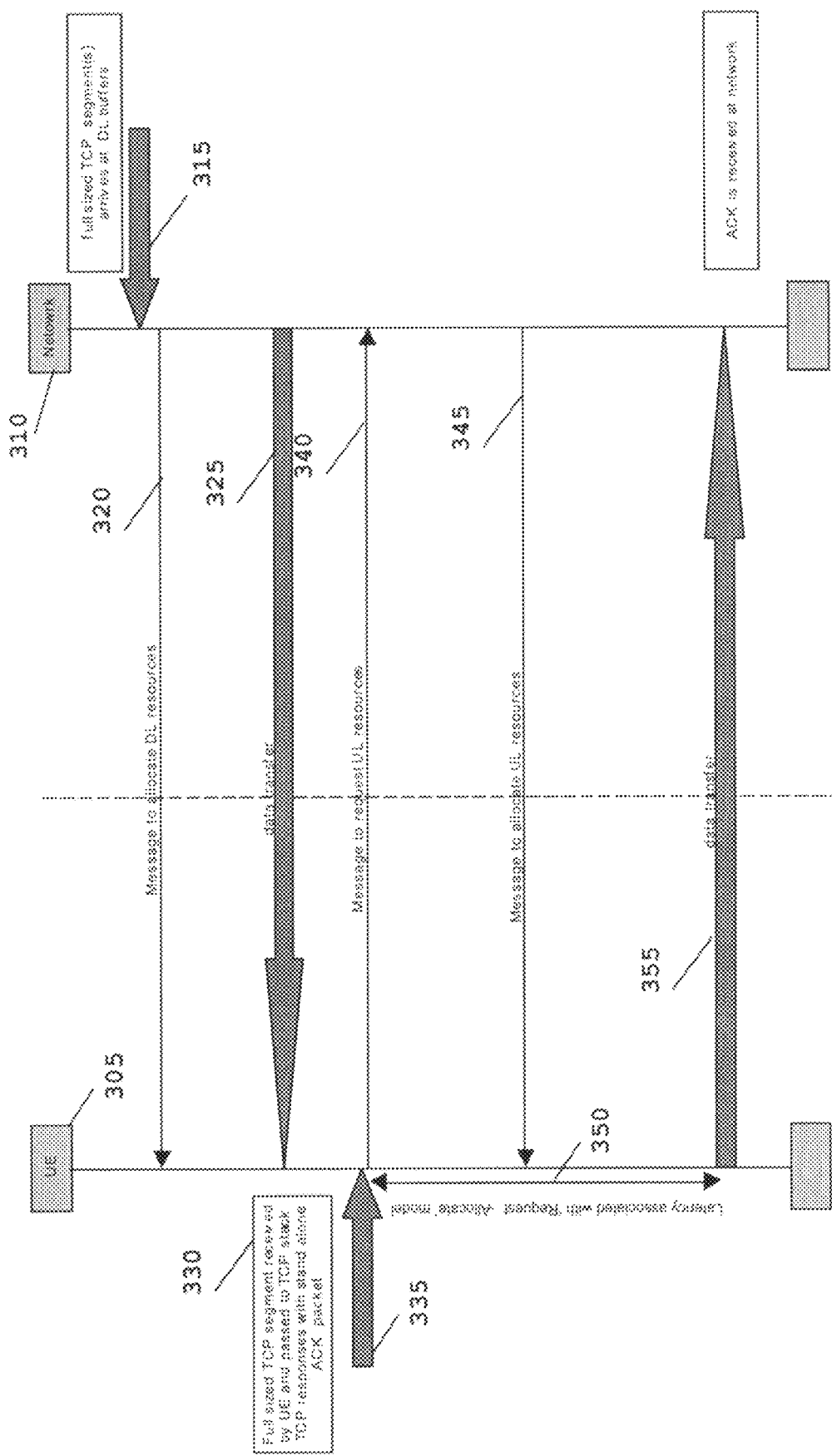

In summary, embodiments of the present invention describe an architecture for supporting a scheduler within the Radio Access Network is configured to allocate 'ACK' resources to a UE.

Referring first to FIG. 4, a typical, standard UMTS Radio Access Network (UTRAN) system 400 is conveniently considered as comprising: terminal/user equipment domain 410; a UMTS Terrestrial Radio Access Network domain 420; and an infrastructure domain 430.

In the terminal/user equipment domain 410, terminal equipment (TE) 412 is connected to mobile equipment (ME) 414 via the wired or wireless R interface. The ME 414 is also connected to a user service identity module (USIM) 416; the ME 414 and the USIM 416 together are considered as user equipment (UE) 418. The UE may be for example a remote unit, a mobile station, a communication terminal, a personal digital assistant, a laptop computer, an embedded communication processor or any communication element communicating over the air interface of the cellular communication system.

The UE 418 communicates data with a Node-B (base station) 422 in the radio access network domain 420 via the wireless Uu interface. Within the radio access network domain 420, the Node-B 422 communicates with a radio network controller (RNC) 424 via the Iub interface. The RNC 424 communicates with other RNCs (not shown) via the Iur interface.

The Node-B 422 and the RNC 424 together form the UTRAN 426. The RNC 424 communicates with a serving GPRS service node (SGSN) 432 in the core network domain 430 via the Iu interface. Within the core network domain 430, the SGSN 432 communicates with a gateway GPRS support node 434 via the Gn interface; the SGSN 432 and the GGSN 434 communicate with a home location register (HLR) server 436 via the Gr interface and the Gc interface respectively. The GGSN 434 communicates with public data network 438 via the Gi interface.

Thus, the elements RNC 424, SGSN 432 and GGSN 434 are conventionally provided as discrete and separate units (on their own respective software/hardware platforms) divided across the radio access network domain 420 and the core network domain 430, as shown FIG. 4.

The RNC 424 is the UTRAN element responsible for the control and allocation of resources for numerous Node-Bs 422; typically 50 to 100 Node-Bs may be controlled by one RNC. The RNC also provides reliable delivery of user traffic over the air interfaces. RNCs communicate with each other (via the Iur interface).

The SGSN 432 is the UMTS Core Network element responsible for Session Control and interface to the HLR. The SGSN keeps track of the location of an individual UE and performs security functions and access control. The SGSN is a large centralised controller for many RNCs.

The GGSN 434 is the UMTS Core Network element responsible for concentrating and tunnelling user data within the core packet network to the ultimate destination (e.g., internet service provider—ISP). Terminal equipment (TE) 412 is connected to mobile equipment (ME) 414 via the wired or wireless R interface. The ME 414 is also connected to a user service identity module (USIM) 416; the ME 414 and the USIM 416 together are considered as user equipment (UE) 418. The UE 418 communicates data with a Node-B (base station) 422 in the radio access network domain 420 via the wireless Uu interface. Within the radio access network domain 420, the Node-B 422 communicates with a radio network controller (RNC) 424 via the Iub interface. The RNC 424 communicates with other RNCs (not shown) via the Iur interface. The Node-B 422 and the RNC 424 together form the UTRAN 426. The RNC 424 communicates with a serving GPRS service node (SGSN) 432 in the core network domain 430 via the Iu interface. Within the core network domain 430, the SGSN 432 communicates with a gateway GPRS support node 434 via the Gn interface; the SGSN 432 and the GGSN 434 communicate with a home location register (HLR) server 436 via the Gr interface and the Gc interface respectively. The GGSN 434 communicates with public data network 430D via the Gi interface.

Thus, the elements RNC 424, SGSN 432 and GGSN 434 are conventionally provided as discrete and separate units (on their own respective software/hardware platforms) divided across the radio access network domain 420 and the core network domain 430, as shown FIG. 4.

The RNC 424 is the UTRAN element responsible for the control and allocation of resources for numerous Node-B's 422; typically 50 to 400 Node-B's may be controlled by one RNC. The RNC 424 also provides reliable delivery of user traffic over the air interfaces. RNCs communicate with each other (via the Iur interface).

The SGSN 432 is the UMTS Core Network element responsible for Session Control and interface to the HLR. The SGSN keeps track of the location of an individual UE and performs security functions and access control. The SGSN is a large centralised controller for many RNCs.

The GGSN 434 is the UMTS Core Network element responsible for concentrating and tunnelling user data within the core packet network to the ultimate destination (e.g., internet service provider—ISP).

Such a UTRAN system and its operation are described more fully in the 3rd Generation Partnership Project technical specification documents 3GPP TS 25.401, 3GPP TS 23.060, and related documents, available from the 3GPP website at www.3gpp.org, and need not be described herein in more detail.

Within the RNC 424, separate functional blocks exist that have been incorporated or adapted in accordance with embodiments of the present invention. In particular, as shown in FIG. 4, a scheduler 428, comprising or operably coupled to counting logic 429, has been adapted to perform the inventive concept as described further with respect to FIG. 5.

Referring now to FIG. 5, a data flow process 500 is illustrated between a UE 505 and a scheduler 428 in the network 510. The inventive concept described in FIG. 5 commences with a full-sized TCP data segment arriving at a DL buffer within the network 510. The network determines that an ACK is likely to be generated by the receiving UE in response to the transmitted TCP data segment, in step 515. The knowledge is based on the fact that with a delayed ACK feature there will be an ACK every other segment. It is therefore possible to easily count DL segments (for each TCP flow, if necessary) and then when the counter reaches two allocate UL resources accordingly. The counter is then reset. Thus, the scheduler is made aware that the data being transferred is using the TCP protocol following transmission of a message to the UE, as shown in step 525.

Notably, the scheduler arranges for the message to indicate an allocation of DL resources plus sufficient UL resources to transfer a stand-alone ACK data segment 530, in step 520. The scheduler 428 (from FIG. 4) continues allocating DL resources to transfer the segments to the UE 505. Notably, the scheduler comprises counting logic 429 arranged to count a number of transmitted segments, as they are transferred to the UE 505. In this manner, the scheduler 428 is made aware of when the end of each data segment is likely to be fully transferred to the UE 505.

In accordance with one embodiment of the present invention, the full-sized TCP data segment is received by the UE 505 and passed to the TCP memory stack of the UE 505. The UE then responds with a stand-alone ACK data segment 545, in step 535. In accordance with one embodiment of the present invention, the stand-alone 'ACK' data segment may be immediately placed in allocated UL resources, so there is no requirement to transmit a message to request UL resources, in step 550.

In one embodiment of the present invention, at the end of every second segment, or greater number of segments depending upon the particular TCP implementation, the allocation message containing a downlink resource allocation will also contain enough uplink resource allocation for a stand-alone ACK to be transmitted. A stand-alone ACK is typically '40' to '60' bytes (though this might be less if some form of header compression is applied). Hence, in this embodiment of the present invention, the UL resource is provided with enough bytes to include the stand-alone ACK message. It is also envisaged that the start of the UL allocation may also be slightly delayed in time, from the DL transmission, in order for the TCP stack at the UE to process the downlink segments and generate the stand-alone ACK.

It is envisaged that it may not be possible to exactly predict a sending of an ACK from the UE. For example, a missing segment may be detected and an ACK generated unexpectedly. Similarly, there may be piggybacked data to send and the allocation may be too small to carry the ACK plus data segment. However, it has been determined that the overall statistical performance is to significantly improve latency at the cost of some wasted uplink resource.

In summary, the inventive concept of the present invention aims to provide at least one or more of the following features:
  (i) A method and apparatus to provide reduced latency in TCP;
  (ii) In large bulk data transfer cases, such as file transfer protocol (FTP), the reduced latency may lead to improved throughput, due to the fact that the overall throughput may be limited by the window size (i.e. number of unacknowledged segments) rather than the throughput possible across the air interface; and
  (iii) In short data transfers such, as hyper-text transfer protocol (HTTP), the observed throughput may be significantly affected by the latency, due to slow start functionality of TCP. Since the latency will be reduced using the inventive concept herein described the overall observed performance (for page download time in the case of HTTP) is improved.

In particular, it is envisaged that the aforementioned inventive concept may be applied by a semiconductor manufacturer to any signal processing integrated circuit (IC). It is further envisaged that, for example, a semiconductor manufacturer may employ the inventive concept in a design of a stand-alone device, or application-specific integrated circuit (ASIC) and/or any other sub-system element.

It will be appreciated that any suitable distribution of functionality between different functional units or logic elements may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, an improved wireless communication system, apparatus, integrated circuit, and a method of operation therefor have been described, wherein the aforementioned disadvantages with prior art arrangements have been substantially alleviated.

The invention claimed is:

1. Apparatus for use in allocating resource in a wireless communication system employing transfer communication protocol (TCP) based data transfer between a network and a wireless subscriber communication unit, the apparatus comprising:
  a scheduler located in the network, wherein the scheduler buffers a TCP data segment for downlink (DL) transmission to user equipment (UE);
  counting logic operably coupled to the scheduler and arranged to count a number of data segments transmitted to the UE, wherein the scheduler is arranged to allocate uplink (UL) resources for supporting a transmission of a stand-alone acknowledgement (ACK) data segment from the UE in response to the counting logic counting a predetermined number of data segments; and
  a transmitter arranged to transmit to the user equipment (UE) an allocation message that indicates an allocation of DL resources and then to transmit to the user equipment the buffered TCP data segment on the allocated DL resources, wherein when the counting logic has counted the predetermined number of data segments the allocation message indicates an allocation of uplink resources sufficient to transfer the stand-alone ACK data segment.

2. The apparatus of claim 1 wherein the apparatus is located in a radio access network that comprises the scheduler arranged to allocate resources to a plurality of UEs.

3. The apparatus of claim 1 wherein the apparatus is a communication unit arranged to operate in a 3rd Generation Partnership Project (3GPP) cellular communication system.

4. The apparatus of claim 1 wherein the apparatus is arranged to operate in a time division duplex code division multiple access cellular communication system.

5. A wireless subscriber communication unit for use in acknowledging an allocation of resource in a wireless communication system employing transfer communication protocol (TCP) based data transfer between a network and the wireless subscriber communication unit, the wireless subscriber communication unit comprising:
  a receiver arranged to receive an allocation message and a TCP data segment;
  processing logic, operably coupled to the receiver and arranged to process the allocation message to identify an allocation of DL resources to receive the TCP data segment plus sufficient uplink (UL) resources to transfer a stand-alone acknowledgement (ACK) data segment, where the allocation of UL resources to support transmission of the stand-alone ACK data segment is based on a count performed in the network of a predetermined number of data segments transmitted to the wireless subscriber communication unit; and a transmitter arranged to transmit the stand-alone ACK data segment in response to the message.

6. The wireless subscriber communication unit of claim 5 wherein the wireless subscriber communication unit immediately transmits the stand-alone ACK data segment in the allocated UL resources following processing the downlink message.

7. The wireless subscriber communication unit of claim 5 wherein the wireless subscriber communication unit is arranged to operate in a 3rd Generation Partnership Project (3GPP) cellular communication system.

8. The wireless subscriber communication unit of claim 5 wherein the wireless subscriber communication unit is arranged to operate in a time division duplex code division multiple access cellular communication system.

9. A method for allocating resource in a wireless communication system employing transfer communication protocol (TCP) based data transfer between a network and a wireless subscriber communication unit, the method comprising:

buffering a TCP data segment for downlink (DL) transmission to the wireless subscriber communication unit; and counting a number of data segments transmitted to the wireless subscriber communication unit;

allocating uplink (UL) resources for supporting a transmission of a stand-alone acknowledgement (ACK) data segment from the wireless subscriber communication unit in response to the counting step having counted at least a predetermined number of the data segments; and first transmitting to the wireless subscriber communication unit an allocation message wherein the message indicates an allocation of DL resources, and then transmitting to the wireless subscriber communication unit the buffered TCP data segment on the allocated DL resources, wherein when the count of the data segments at least equals the predetermined number of the data segments the allocation message indicates an allocation of UL resources sufficient to transfer the stand-alone ACK data segment.

10. The method for allocating resource of claim 9 wherein the method is applied in a 3rd Generation Partnership Project (3GPP) cellular communication system.

11. The method for allocating resource of claim 9 wherein the method is applied in a time division duplex code division multiple access cellular communication system.

12. A method for acknowledging an allocation of resource in a wireless communication system employing transfer communication protocol (TCP) based data transfer between a network and a wireless subscriber communication unit, the method comprising:

receiving an allocation message and a TCP data segment;
processing the allocation message;
identifying an allocation of DL resources to receive the TCP data segment plus sufficient uplink (UL) resources to transfer a stand-alone acknowledgement (ACK) data segment, where the allocation of UL resources to support transmission of the stand-alone ACK data segment is based on a count performed in the network of a predetermined number of data segments transmitted to the wireless subscriber communication unit; and
transmitting the stand-alone ACK data segment in response to the allocation message.

13. The method for acknowledging an allocation of resource claim 12 wherein the step of transmitting the stand-alone ACK data segment in the allocated UL resources is performed immediately following the step of processing and identifying.

14. The method for acknowledging an allocation of resource of claim 12 wherein the method is applied in a 3rd Generation Partnership Project (3GPP) cellular communication system.

15. The method for acknowledging an allocation of resource of claim 12 wherein the method is applied in a time division duplex code division multiple access cellular communication system.

16. A non-transitory computer program product having executable program code stored therein for allocating resource in a wireless communication system, the program code operable for when executed at a communication unit:

buffering a TCP data segment for downlink (DL) transmission to a wireless subscriber communication unit; and counting a number of data segments transmitted to the wireless subscriber communication unit;

allocating uplink (UL) resources for supporting a transmission of a stand-alone acknowledgement (ACK) data segment from the wireless subscriber communication unit in response to when the count of the data segments at least equals a predetermined number of the data segments; and first transmitting to the wireless subscriber communication unit an allocation message that indicates an allocation of DL resources and then transmitting to the wireless subscriber communication unit the buffered TCP data segment on the allocated DL resources, wherein when the count of the data segments at least equals the predetermined number of the data segments the allocation message indicates an allocation of UL resources sufficient to transfer the stand-alone ACK data segment.

17. A wireless communication system comprising a radio access network facilitating communication to a plurality of wireless subscriber communication units, the wireless communication system comprising:

a scheduler located in the network, wherein the scheduler buffers a transfer communication protocol (TCP) data segment for downlink (DL) transmission to a wireless subscriber communication unit; and counting logic operably coupled to the scheduler and arranged to count a number of data segments transmitted to the UE, wherein the scheduler is arranged to allocate uplink (UL) resources for supporting a transmission of a stand-alone acknowledgement (ACK) data segment from the UE in response to the counting logic counting a predetermined number of data segments; and a transmitter arranged to transmit to the wireless subscriber communication unit an allocation message that indicates an allocation of DL resources and then to transmit to the wireless subscriber communication unit the buffered TCP data segment on the allocated DL resources, wherein when the counting logic has counted the predetermined number of data segments the allocation message indicates an allocation of uplink (UL) resources sufficient to transfer the stand-alone ACK data segment.

18. The wireless communication system of claim 17 wherein the wireless subscriber communication unit comprises:

a receiver arranged to receive the DL allocation message comprising and the transfer communication protocol (TCP) data segment;

processing logic, operably coupled to the receiver and arranged to process the allocation message to identify an allocation of DL resources to receive the TCP data segment plus sufficient uplink resources to transfer the stand-alone acknowledgement (ACK) data segment; and a transmitter arranged to transmit the stand-alone ACK data segment in response to the allocation message.

19. The wireless communication system of claim 17 wherein the wireless communication system is a 3rd Generation Partnership Project (3GPP) cellular communication system.

20. The wireless communication system of claim 17 wherein the wireless communication system is a time division duplex code division multiple access cellular communication system.

21. An apparatus, comprising:
a memory;
a processor coupled to the memory; and
program code stored in the memory and executable on the processor, the program code operable for:
buffering a transfer communication protocol (TCP) data segment for downlink (DL) transmission to a wireless subscriber communication unit;
counting a number of data segments transmitted to the wireless subscriber communication unit;
allocating uplink (UL) resources for supporting a transmission of a stand-alone acknowledgement (ACK) data segment from the wireless subscriber communication unit in response to when the count of data segments equals a predetermined number of data segments; and
first transmitting to the wireless subscriber communication unit an allocation message that indicates an allocation of DL resources and then transmitting to the wireless subscriber communication unit the buffered TCP data segment on the allocated DL resources, wherein when the count of data segments at least equals the predetermined count of data segments the allocation message indicates an allocation of UL resources sufficient to transfer the stand-alone ACK data segment.

22. An apparatus, comprising:
non-transitory logic for buffering a transfer communication protocol (TCP) data segment for downlink (DL) transmission to a wireless subscriber communication unit; and
non-transitory logic for counting a number of data segments transmitted to the wireless subscriber communication unit;
non-transitory logic for allocating uplink (UL) resources for supporting a transmission of a stand-alone acknowledgement (ACK) data segment from the wireless subscriber communication unit in response to when the count of the number of data segments at least equals a predetermined number of data segments; and
non-transitory logic for transmitting to the wireless subscriber communication unit an allocation message that indicates an allocation of DL resources and for then transmitting to the wireless subscriber communication unit the buffered TCP data segment on the allocated DL resources, wherein when the count of the number of data segments at least equals the predetermined number of data segments the allocation message indicates an allocation of UL resources sufficient to transfer the stand-alone ACK data segment.

23. An apparatus, comprising:
a memory;
a processor coupled to the memory; and
program code stored in the memory and executable on the processor, the program code operable for:
receiving an allocation message and a transfer communication protocol (TCP) data segment;
processing the allocation message;
identifying an allocation of DL resources to receive the TCP data segment plus sufficient uplink (UL) resources to transfer a stand-alone acknowledgement (ACK) data segment, where the allocation of UL resources to support transmission of the stand-alone ACK data segment is based on a count performed external to the apparatus of a predetermined number of data segments transmitted to the wireless subscriber communication unit; and
transmitting the stand-alone ACK data segment in response to the allocation message.

24. An apparatus, comprising:
non-transitory logic for receiving allocation message and a transfer communication protocol TCP data segment;
non-transitory logic for processing the allocation message;
non-transitory logic for identifying an allocation of DL resources to receive the TCP data segmenet plus sufficient uplink (UL) resources to transfer a stand-alone acknowledgement (ACK) data segment, where the allocation of UL resources to support transmission of the stand-alone ACK data segment is based on a count performed external to the apparatus of a predetermined number of data segments transmitted to the wireless subscriber communication unit; and
non-transitory logic for transmitting the stand-alone ACK data segment in response to the allocation message.

* * * * *

UNITED STATES PATENT AND TRADEMARK OFFICE
CERTIFICATE OF CORRECTION

PATENT NO.         : 8,031,654 B2                                  Page 1 of 1
APPLICATION NO.    : 11/726397
DATED              : October 4, 2011
INVENTOR(S)        : Timothy J. Speight It is certified that error appears in the above-identified patent and that said Letters Patent is hereby corrected as shown below:

TITLE PAGE:
Item (54): Change "SUPPPORTING" to -- SUPPORTING --.

Column 1, Line 2: Change "SUPPPORTING" to -- SUPPORTING --.

Column 12, Claim 18, Line 62: After "the" delete "DL";

Column 12, Claim 18, Line 63: Before "and" delete "comprising";

Column 14, Claim 24, Line 37: Change "segmenet" to -- segment --.

Signed and Sealed this
Tenth Day of April, 2012

David J. Kappos
*Director of the United States Patent and Trademark Office*